US005555256A

United States Patent [19]
Calamvokis

[11] Patent Number: 5,555,256
[45] Date of Patent: Sep. 10, 1996

[54] CHANNEL IDENTIFIER GENERATION

[75] Inventor: Costas Calamvokis, Bishopston, England

[73] Assignee: Hewlett-Packard Company, Palo Alto, Calif.

[21] Appl. No.: 423,125

[22] Filed: Apr. 14, 1995

[30] Foreign Application Priority Data

Apr. 28, 1994 [EP] European Pat. Off. ............. 94303119

[51] Int. Cl.[6] .............................. H04L 9/16; H04L 12/56
[52] U.S. Cl. .......................... 370/60.1; 370/94.2; 380/43
[58] Field of Search ......................... 370/54, 58.1, 58.2, 370/58.3, 60, 60.1, 61, 79, 82, 85.13, 94.1, 94.2, 94.3; 380/9.21, 42, 43, 44, 49; 395/275

[56] References Cited

U.S. PATENT DOCUMENTS

| | | | |
|---|---|---|---|
| 5,119,369 | 6/1992 | Tanabe et al. | 370/60 |
| 5,323,389 | 6/1994 | Bitz et al. | 370/60.1 |
| 5,408,469 | 4/1995 | Opher et al. | 370/60.1 |
| 5,432,777 | 7/1995 | Le Boudec et al. | 370/60 |
| 5,440,547 | 8/1995 | Easki et al. | 370/60 |
| 5,450,399 | 9/1995 | Sugita | 370/60.1 |

FOREIGN PATENT DOCUMENTS 0500238  8/1992  European Pat. Off. .

OTHER PUBLICATIONS

Patent Abstracts of Japan vol. 16, No. 526 (E–1286) 28 Oct. 1992 & JP‘A–41 096 847 (OKI Electric Ind. Co. Ltd.) 16 Jul. 1992.
A. V. Aho et al. 'Data structures and aglorithms' 1983, Addison Wesley, USA paragraph 4.12.

*Primary Examiner*—Alpus H. Hsu

[57] ABSTRACT

A method and arrangement are disclosed for generating a cell-channel identifier ("master VCN") for cells received through at least one input port of an apparatus intended to carry out predetermined functions in respect of these cells. Each cell is, for example, an ATM cell including a channel label that uniquely identifies, for the input port on which the cell is received by the apparatus, a virtual channel with which the cell is associated. In order to provide the master VCN of each cell received, a K-dimensional lookup table storing master VCNs is created. Then for each cell received, a long channel identifier is generated by combining the channel label of the cell with a port label identifying the input port on which the cell was received. Preferably, the long channel identifier is scrambled before being split to provide K keys. Next, these keys are converted into shorter indexes using, for example, simple lookup lists. Finally, the indexes are used to access into the table storing the master VCNs in order to retrieve the master VCN for the cell concerned. The same approach may also be used to provide master VCNs for systems using variable-length packets.

12 Claims, 11 Drawing Sheets

PORT A = 51 Mb/s
PORT B = 100 Mb/s
PORT C = 155 Mb/s
PORT D = 155 Mb/s
PORT E = 155 Mb/s

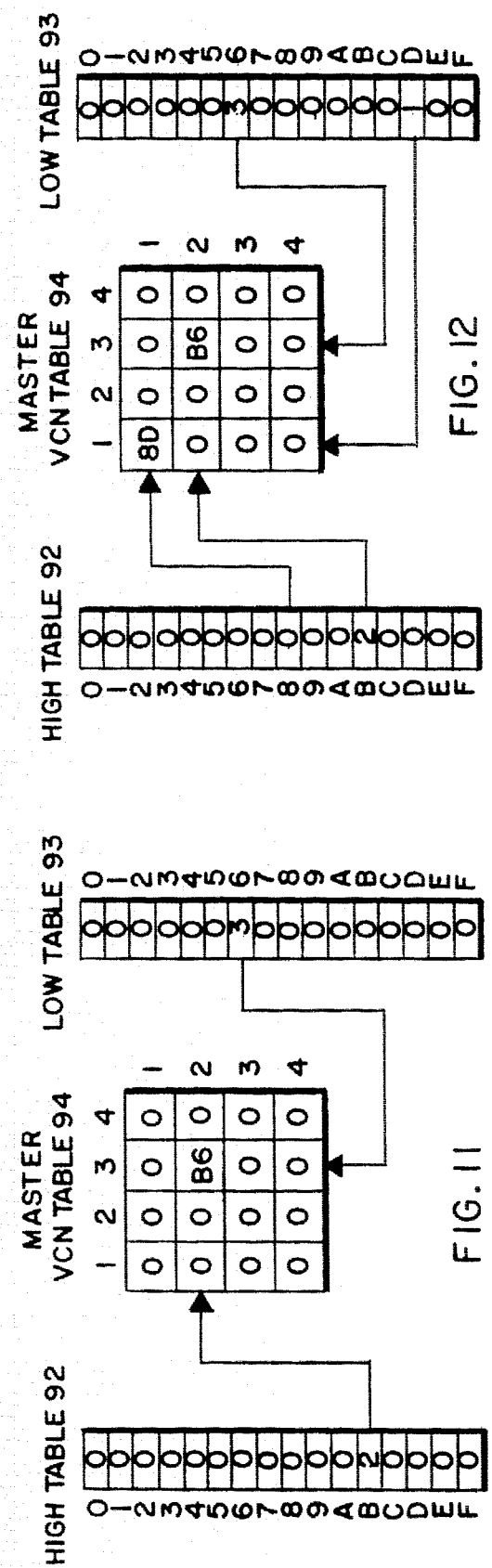
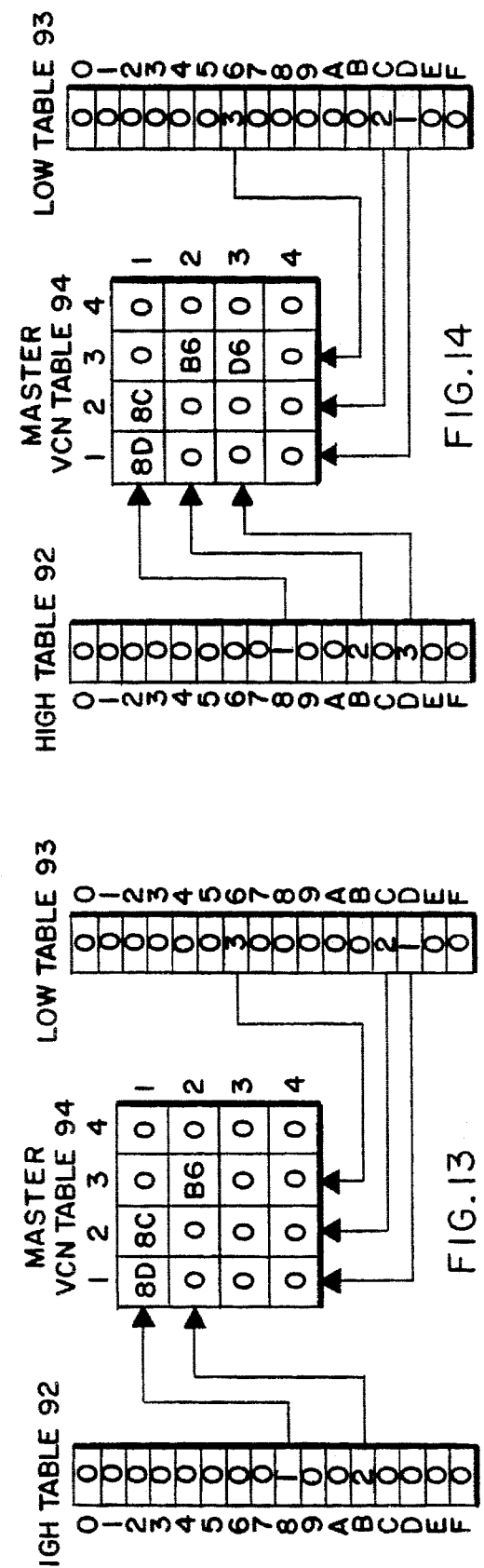

CHANNEL IDENTIFIER GENERATION

The present invention relates to the generation of channel identifiers in packet-based systems (including systems handling fixed-length packets or "cells"); in particular, but not exclusively, the present invention concerns the unique identification of the virtual channel on which a cell is received in an ATM switch having multiple input ports.

ATM (Asynchronous Transfer Mode) is a multiplexing and switching technique for transferring data across a network using fixed sized cells that are synchronous in the sense that they appear strictly periodically on the physical medium. Each cell comprises a payload portion and a header, the latter including a label that associates the cell with an instance of communication between sending and receiving network end systems; this instance of communication may involve the transfer of many cells from the sending end system, possibly to multiple receiving end systems. ATM is asynchronous in the sense that cells belonging to the same instance of communication will not necessarily appear at periodic intervals.

In ATM, the labels appended to the cells am fixed-size context dependent labels, that is, they are only understandable in the light of context information already established at the interpreting network node, the label generally being replaced at one node by the label required for the next node. In other words, ATM is a virtual circuit technology requiring a set up phase for each instance of communication to establish the appropriate label knowledge at each node.

ATM technology is finding increasing popularity because it can offer an acceptable compromise in combining timeliness characteristics (normally associated with circuit switching technologies) and statistical advantage (associated with packet switching technologies). ATM holds out the prospect of a single transfer mode technology for carrying all traffic types, including voice, entertainment services, or computer traffic.

The present invention is applicable generally to ATM systems (and similar systems) independently of specific implementation details such as cell size and reference to ATM in the accompanying claims should be accordingly interpreted. However, in the following description, particular reference will be made to the emerging B-ISDN ATM standards being evolved by the CCITT and the ATM Forum (the former being primarily concerned with public networks and the latter with computer-related user networks).

In fact, even within these emerging standards, the semantics of the information contained in the header portion of each cell varies depending on where in the network the cell appears (at its edge or internally), and the nature of the overlying ATM adaption layer which processes ATM cells in the network end systems. Unless specifically stated otherwise, in the following description the cell format under consideration is the B-ISDN UNI (User Network Interface) cell format for AAL5 services ("AAL" refers to the ATM Adaption Layer, AAL5 being a connection oriented, variable bit rate asynchronous communication service appropriate to computer communication).

FIG. 1 of the accompanying drawings shows the format of such a cell in a byte wide format. As can be seen, the cell is made up of a 5-byte header and a 48-byte payload of user data. The header fields are as follows:

GFC 4 bits General Flow Control Field;
VPI 8 bits Virtual Path Indicator field;
VCI 16 bits Virtual Channel Indicator field;
PT 3 bits Payload Type Field;
EOP 1 bit End of Packet Field;
HEC 8 bits Header Error Check Field;

The VPI and VCI together form the virtual circuit label for the cell on a particular link and this label forms the basis on which the cell is routed at the next network node it encounters. Generally, in ATM parlance, a virtual circuit is called a "Virtual Channel" and the VPI fields can be thought of as identifying a group of virtual channels on a link whilst the VCI identifies a particular virtual channel in that group.

The EOP bit is used to indicate that the cell is the last cell of a sequence of cells that together make up a higher level application data unit (packet). The advantage of giving this end of packet information visibility in the cell header, is that it enables all the cells making up a packet to be discarded if one constituent cell is lost.

An ATM cell arriving at a network node through a particular input port will be re-routed (or switched) according to the VPI and VCI information stored in the cell header and the context information established in the node at set up time. The VPI and VCI information will be changed and the cell output. Such a node is generally referred to as an ATM switch as illustrated in FIG. 2, and conceptually comprises a switch core 200 that is responsible for carrying out the following operations on the cells it handles:

determining which cell belongs to which channel having regard to the fact that the VPI and VCI information stored in each cell is only unique for a given link;

deciding what channel a cell is destined for and routing it there; and, arbitrating among demands for access to the appropriate output port.

The switch will also include some sort of a processor unit 201 for looking after channel set up and any management functions, and interface circuitry 202 for interfacing the switch core to the links 203 connected by the switch, these links connecting to respective external ports of the switch.

The switch core is generally designed to have a high bandwidth and this enables the switch to be used to service a plurality of links that are either inherently or statistically of low bandwidth, these links being first multiplexed together before being fed to the switch core. Conversely, the output of the switch core is demultiplexed for passing to the appropriate link.

The combined size of the VPI and VCI fields in a cell header is 24 bits and if a link identifier is also added to this to produce a channel label unique across all links, the resultant label becomes too long to be used as a practical tag for processing internally within an ATM switch (for example, in carrying out scheduling). Accordingly, in the past ATM switch implementations have frequently avoided using the full VPI+VCI fields, this being justified on the basis that the full field size will only rarely be required.

The present invention relates to an arrangement permitting the full VPI+VCI fields to be used whilst providing a channel identifying tag of manageable size for use within an ATM switch (or other apparatus carrying out predetermined functions in respect of received cells or packets).

SUMMARY OF THE INVENTION

According to one aspect of the present invention, there is provided apparatus for carrying out predetermined functions in respect of packets received thereby through at least one input port of the apparatus, each packet including a channel label that uniquely identifies, for the input port on which the packet is received by the apparatus, a virtual channel with which the packet is associated; the apparatus including VCN-providing means for providing for each packet received by the apparatus, an identifier, herein a "master VCN", that uniquely identifies the combination of virtual channel and input port associated with the packet, and processing means for carrying out said predetermined functions in respect of each packet in dependence on the master VCN provided for the packet by the VCN-providing means, the VCN-providing means comprising:

port identification means for generating for each packet a respective port label identifying the input port on which the packet was received, combining means for combining together the channel label and port label associated with a packet to produce a long channel identifier which is then output, key-providing means for dividing up the output of the combining means in predetermined manner to provide K keys where K is an integer greater than or equal to 2, and table lookup means to which the K keys are applied, the table lookup means comprising:

respective conversion means for converting each of the K keys associated with a packet into a corresponding, shorter index, and a K-dimensional master table having locations holding respective master VCNs, the K indexes derived from the same packet serving to access a corresponding master-table location in order to provide the master VCN of the packet concerned.

VCN-providing means of this form enables master VCNs to be provided that are substantially shorter than the long channel identifiers from which they are derived.

In one embodiment of the invention relating to an ATM switch, the parameter K has a value of 2.

Preferably, the combining means is operative to scramble the long channel identifier before it is output.

Generally, the key-providing means provides the K keys by dividing the output from the combining means into K equal segments; however, other divisions of the output are also possible separating elements (e.g. digits) of the output into K groups and possibly mixing the elements within a group.

Advantageously, the VCN-providing means further comprises checking means for checking the correctness of the master VCN provided by the table lookup means, the checking means comprising:

check table means associating each master VCN with at least a predetermined part of the long channel identifier that should have been involved in the provision of the master VCN, the check table means outputting said at least a predetermined part upon a master VCN being supplied thereto, and, comparison means for comparing the output of the check table means with the corresponding portion of the long channel identifier actually used in providing the master VCN supplied to the check table means, the comparison means being operative to output an indication of the result of this comparison.

A preferred form of the apparatus comprises a core including the VCN-providing means, and external interface means providing a plurality of input ports and including multiplexer means for multiplexing packets received at the input ports and passing them according to a predetermined timing to the core. In this case, the port identification means can be arranged to generate the port label for a packet in dependence on the time of arrival of the packet at the core.

Advantageously, each conversion means includes list means that associates the related key with the corresponding index. In this context, the term "list means" is to be broadly understood to cover any structure acting like a list whereby a key can be used to lookup a corresponding index.

Of course, the apparatus will generally require to be provided with new-entry means for setting up the table lookup means to provide a master VCN for the packets of a new virtual channel where the channel and port labels associated with these packets are such as to cause the application to the table lookup means of K characteristic keys hereinafter referred to as the new keys. The new-entry means preferably comprises:

insertion means for inserting the master VCN of the new virtual channel in a specified location of the master table, determining means for determining whether the K new keys reference existing indexes in the list means, and list set-up means for inserting an appropriate said index into the corresponding list means upon the determining means determining that a said index is absent, said list set-up means choosing said appropriate index such that the pair of indexes referenced by the new keys, identifies a location in the master table that is free and is well distributed relative to existing occupied table locations, and the list set-up means notifying the free table location indicated by the indexes to the insertion means to cause the latter to insert the master VCN therein.

Advantageously, the new-entry means further comprises:

examining means for examining the table location pointed to by the indexes upon the determining means determining that indexes already exist for all the keys, the examining means on finding that the table location is free, causing the insertion means to insert the master VCN of the new virtual channel therein, and adjustment means responsive to the examining means finding that an occupying entry exists in the table location pointed to by the indexes, to determine whether by adjustment of a said index associated with the occupying entry, the table location can be freed and ,if so, to implement this adjustment and cause the insertion means to insert the master VCN of the new virtual channel therein.

Preferably, the new-entry means further comprises further adjustment means operative in the event of the adjustment means being unable to free up the table location, to remove the occupying entry and replace it with the master VCN for the new virtual circuit, and to thereafter determine whether by adjustment of a said index associated with the the master VCN, the table location can be freed and, if so, to implement this adjustment and replace the occupying entry therein.

According to another aspect of the present invention, there is provided a method of generating a packet-stream identifier, herein a "master VCN", for packets received through at least one input port of an apparatus intended to carry out predetermined functions in respect of the packets, each such packet including a channel label that uniquely identifies, for the input port on which the packet is received by the apparatus, a virtual channel with which the packet is associated; the method comprising the steps of:

providing a K-dimensional lookup table storing master VCNs where K is an integer greater than or equal to 2, and carrying out the following sub-steps to provide the master VCN associated with a particular said packet:

(i)—generating for said packet a port label identifying the input port on which the packet was received, (ii)—combining together the channel label and port label associated with said packet to produce a long channel identifier, (iii)—dividing up the long channel identifier in predetermined manner to provide K keys, (iv)—converting each key into a corresponding, respective, shorter, index, and (vi)—using the K indexes to look up a master VCN for the packet concerned in the K-dimensional lookup table.

Preferably, the method comprises the further sub-step of scrambling the long channel identifier, sub-step (iii) thereafter being effected on the scrambled long channel identifier.

According to a further aspect of the present invention, there is provided apparatus for carrying out predetermined functions in respect of packets received thereby through at least one input port of the apparatus, each packet including a channel label that uniquely identifies, for the input port on which the packet is received by the apparatus, a virtual channel with which the packet is associated; the apparatus including VCN-providing means for providing for each packet received by the apparatus, an identifier, herein a "master VCN", that uniquely identifies the combination of virtual channel and input port associated with the packet, and processing means for carrying out said predetermined functions in respect of each packet in dependence on the master VCN provided for the packet by the VCN-providing means, the VCN-providing means comprising:

port identification means for generating for each packet a respective port label identifying the input port on which the packet was received, combining means for combining together the channel label and port label associated with a packet to produce a long channel identifier which is then scrambled by the combining means, key-providing means for dividing up the scrambled long channel identifier of a packet in predetermined manner to provide at least two keys, and table lookup means including a master table holding master VCNs, the table lookup means being responsive to the application thereto of the said at least two keys associated with a particular packet to output the master VCN for that packet.

BRIEF DESCRIPTION OF THE DRAWINGS

An ATM switch embodying the invention will now be particularly described, by way of non-limiting example, with reference to the accompanying diagrammatic drawings in which:

FIGS. 11 to 20 are diagrams illustrating the updating of various tables maintained by the FIG. 10 lookup block upon setting up of a new virtual channel.

BEST MODE FOR CARRYING OUT THE INVENTION

Architectural Overview

The ATM switch to be described hereinafter has a high-bandwith, N-port, switch core to which low-speed links are interfaced via multiplexer/demultiplexer units associated with respective switch core ports. The switch core services its ports cyclically to take in new cells for processing one at a time; there are thus two levels of multiplexing/de-multiplexing embodied in the architecture (except, of course, when N=1).

Figure 1:
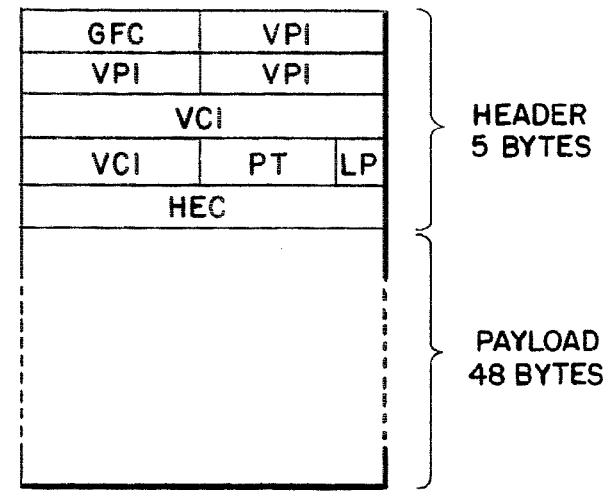
FIG. 1 is a diagram of the format of a standard ATM UNI cell for an AAL5 connection, this Figure constituting prior art and having already been discussed above.
Figure 2:
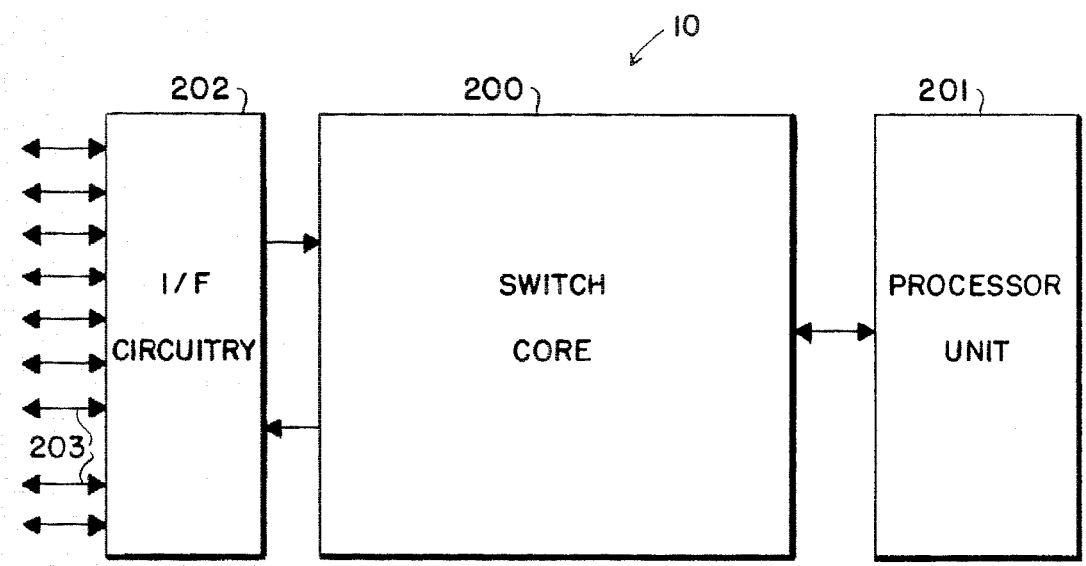
FIG. 2 is a diagram of a general ATM switch architecture, this general architecture being known and having already been referred to above.
Figure 3:
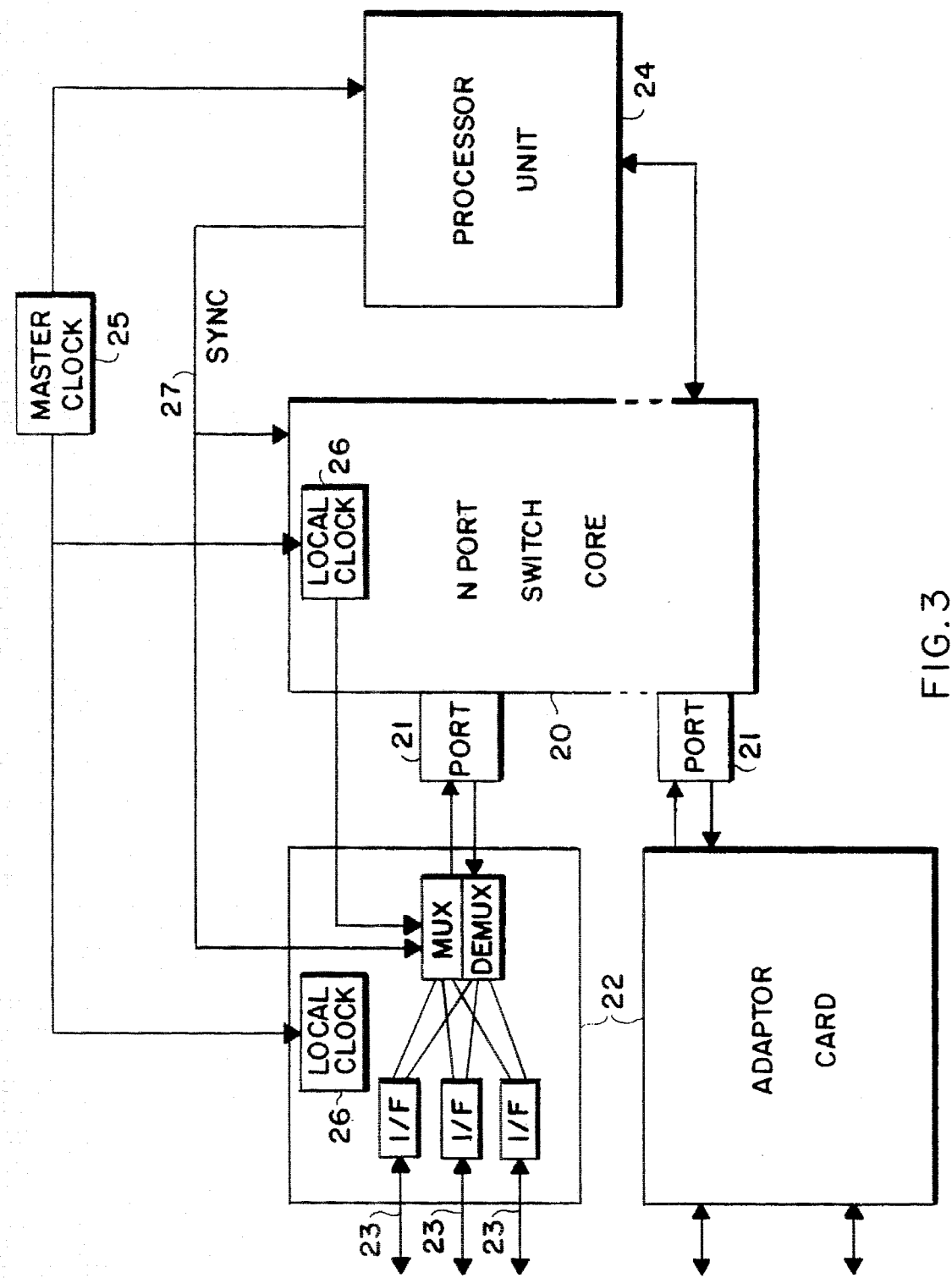
FIG. 3 is a top-level diagram of the ATM switch embodying the invention.

Referring more specifically to FIG. 3, at the top level the switch embodying the invention can be thought of as consisting of three main types of blocks. At the center there is the N-port switch core 20, each switch core port 21 operating at the same predetermined speed of, for example, 622 Mb/s. Attached to each of the ports 21 is an adapter card 22. Each adapter card 22 interfaces a number of lower speed external switch ports 23 to a switch core port. Finally there is the processor board 24, which performs the signalling and virtual channel setup functions.

To give specivity to the switch description, the switch core ports are taken as operating at 622 Mb/s; however, it will be appreciated that this port speed is not critical to the present invention, higher and lower speeds being possible.

The architecture of the switch is a "shared everything" architecture. This means that there are no substantial resources dedicated to any particular port and buffering and intelligence are centralized. Thus the Adapter Cards contain almost no buffering and intelligence.

A common master clock 25 feeds clock signals to all three main switch blocks (switch core 20, adaptor cards 22, processor 24) and local slave-clock units 26 generate appropriate local clock signals; this arrangement ensures that the clock speeds have a constant predetermined relationship. A line 27 provides a global synchronising signal from the processor block 24 to the switch core 20 and adaptor cards 22 to synchronise operation of the blocks at start up.

The following three subsections describe each of the three above referred to main blocks in more detail.

N-Port Switch Core 20

Figure 4:
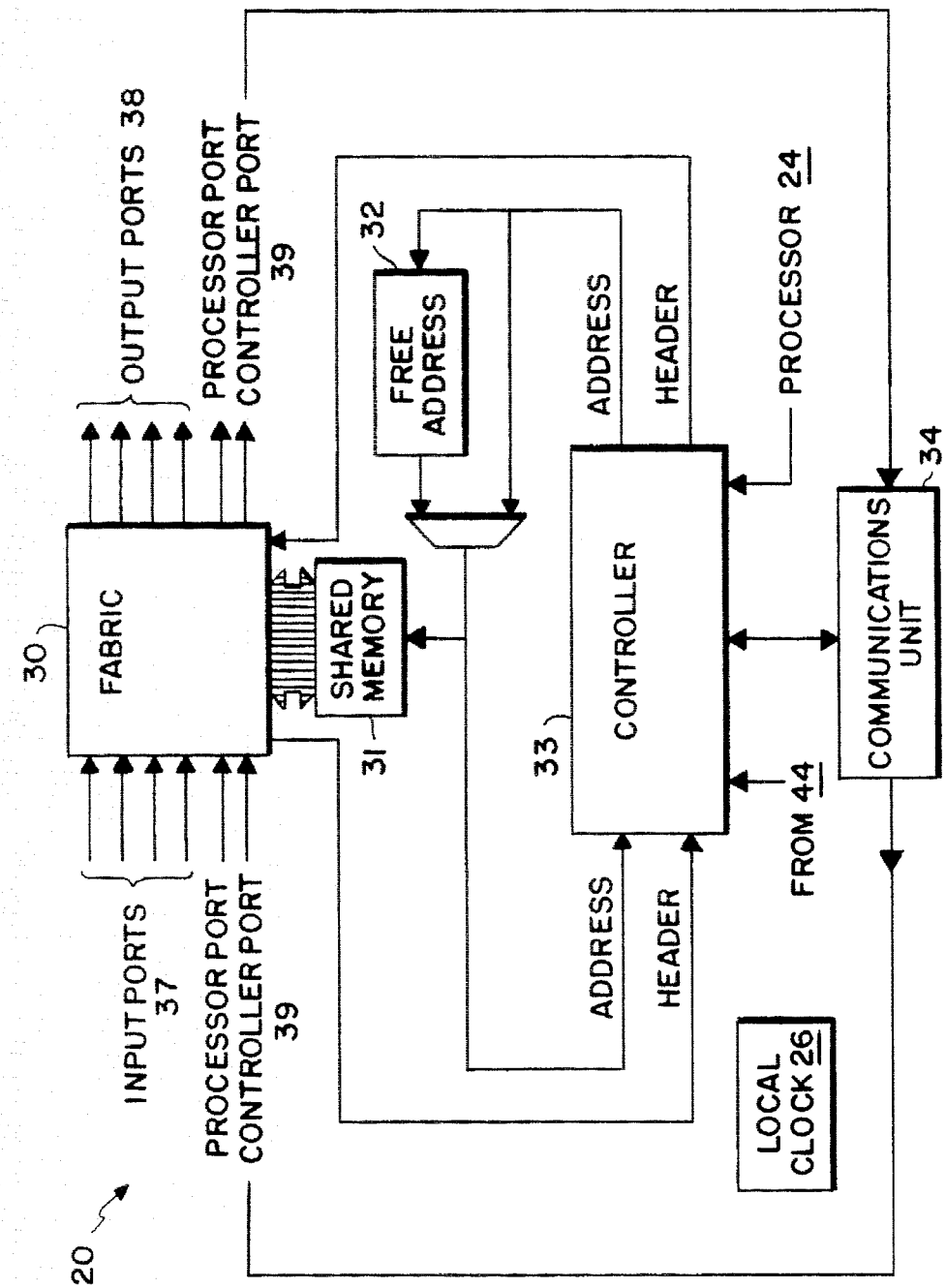
FIG. 4 is a block diagram of a switch core block of the FIG. 3 switch.

A block diagram of the N-port Switch Core 20 is shown in FIG. 4 and, as can be seen, the switch core comprises a switch fabric 30 with input and output ports 37, 38 which are generally paired and as such constitute the switch core ports, a shared cell-body memory 31, a free address list memory 32, a controller 33, and a communications block 34 for carrying out ATM adaption layer and other higher communication layers processing of cells intended for/coming from the controller (thereby enabling the latter to communicate over the network of which the switch forms a part).

At this level of abstraction, operation of the switch core is very simple. The N input ports 37 are serviced in strict order one cell at a time. When a cell comes in on one of the input ports the Fabric 30 writes the cell body into the Shared Cell Body Memory 31 at an address taken from the free address list memory 32. This address is also passed to the Controller 33, along with the header of the cell to which it relates. Because the input ports 37 are serviced in a fixed order, the Controller 33 can tell the source of the cell from the arrival time of the header.

The controller 33 stores and processes the headers and cell body addresses of incoming cells. It also makes decisions about which cell to send next on each output port 38 based on the queueing model and scheduling policies (to be described hereinafter). To send a cell the controller outputs the cell's header and the address at which the cell's body is stored. The fabric 30 reads the cell body out of the Shared Cell Body Memory 31, combines it with the header and sends the cell on an output port. As the output ports are also serviced in a fixed order, the destination of the cell is determined by the time at which the controller sends the header and address. As well as the main switch core ports (input/output port pairs 37,38) to which Adapter Cards 22 attach, the Fabric 30 also supports two slower ports. One of these ports 39 is used by the processor 24 to send and receive cells, the other is used by the controller to send and receive flow control cells via the unit 34.

The bandwidth of the Shared Cell Body Memory 31 and the Controller 33 is sufficient to accommodate receiving cells from all the input ports 37 and sending cells to all the output ports 38 at the maximum rate of these ports. The clocking of the constituent elements of the switch core 20 is controlled by the local clock unit 26.

Considering the timing of switch core operation in more detail, if the period between successive cell arrivals at the given main switch core port speed (622 Mb/s) is T, then for an N-port switch core, the fabric 30 must be capable of receiving N cells in each period T, that is, one cell from each main switch core input port 37. Similarly, the fabric must be capable of sending N cells in period T, that is, one cell for each output port 38. The fabric 30 must also be able to handle the transfer of cells through the processor and controller ports.

The fabric basically comprises a plurality of shift registers into and out of which cells are transferred, by shifting, through the main switch ports, these transfers going on at the same time for all ports; the transfer of cell body data between the shift registers of the fabric 30 and the shared memory 31 and of the cell headers to/from the controller 33 is then done by parallel transfer from/to the shift registers according to a predetermined cycle of transfers that deal with each port in turn.

The general process involved for each cell transferred in through a switch core port is thus that the cell header is first shifted into the fabric followed by the cell body; whilst the cell body is being shifted in, the cell header is transferred out to the controller and then during the subsequent transfer of the cell body to the memory 31, the header of the next cell for the port concerned is shifted into the fabric. As similar but opposite process is followed to output a cell.

So far as the transfers to the cell body memory 31 are concerned, the transfer cycle simply goes round each main switch port in turn (for example, if there are four input ports 37 and four output ports 38, the transfer cycle might first service each input port in turn transferring cell body data to the memory 31, and then service each output port in turn, transferring data from the memory 31 to the fabric). The transfer of cell body data between the memory 31 and the shift registers associated with the controller and processor ports is handled by the fabric in predetermined redundant portions of the cell transfer cycle for the main switch core ports.

Figure 5:
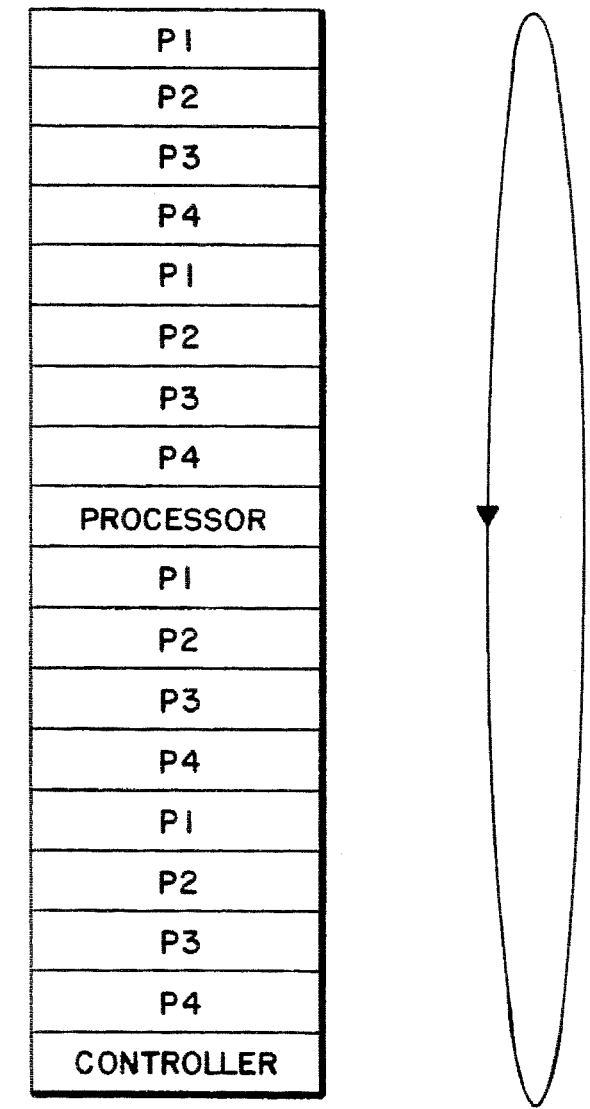
FIG. 5 is a table depicting a service rota for the switch core ports.

The transfer of cell headers between the fabric 30 and the controller 33 may follow a similar transfer cycle as for the cell body transfers provided that the controller 33 receives and can output headers sequentially (the controller effecting its processing sequentially). Thus, the controller and processor ports must be allocated their own slots in an overall port service cycle followed by the controller. Of course, the controller and processor ports are not serviced as frequently as the main switch core ports and generally, if the processor and controller ports run at $1/n^{th}$ of the speed of the main ports, then the processor and controller ports will be serviced only once every n services of the main ports. The result is an overall port service cycle such as illustrated in FIG. 5 for a switch core having four main ports P1 to P4, this cycle applying both to the input of headers to the controller 33 and to the output of headers frown the controller (in fact, the cycles need not be the same for input and output, but generally this will be the case).

The cell headers passed to the controller 33 are associated with their corresponding cell bodies by the addresses that are used to store the cell bodies in the memory 31, these addresses being stored with the header data in the controller 33. It will be appreciated that the address at which a cell body is stored must be supplied to the controller 33 at a timing appropriate to ensure it is stored with the correct header.

As is explained hereinafter, certain of the cells supplied through the main switch core ports may be empty cells (or, more precisely, cells that are to be ignored), this condition being indicated by the values of VPI and VCI being set to zero in the cell header. The presence of such a cell does not alter the process of transferring the cell body to the memory 31 or cell header to the controller 33; however, upon the controller 33 finding that the VPI and VCI of the cell header are zero, it simply passes the associated address at which the cell body has been stored, back to the free address list 32, it being unnecessary to take any action in the memory 31 itself.

Adapter Card 22

Each Adapter Card combines a number of external input/output port pairs into one switch core port. The external input/output ports on one Adapter card may consist of any combination of links provided the bandwidth of these links sums to less than the switch core port speed. For instance, if the switch core port speed is 622 Mb/s, an Adapter card might contain twelve 51 Mb/s ports, or four 155 Mb/s ports or a mixture of speeds such as three 155 Mb/s, one 100 Mb/s and one 51 Mb/s port.

The Adapter Card's operation is very simple. For the most part it does not look at the cells it handles. One exception to this is the Header Error Check (HEC) field of each cell, which is generated by the Adapter Card for cells going out and checked by the Adapter Card for cells coming in. If the HEC fails for an incoming cell then the Adapter Card turns the cell into an empty cell by setting the VPI and VCI fields of the cell to zero.

Figure 6:
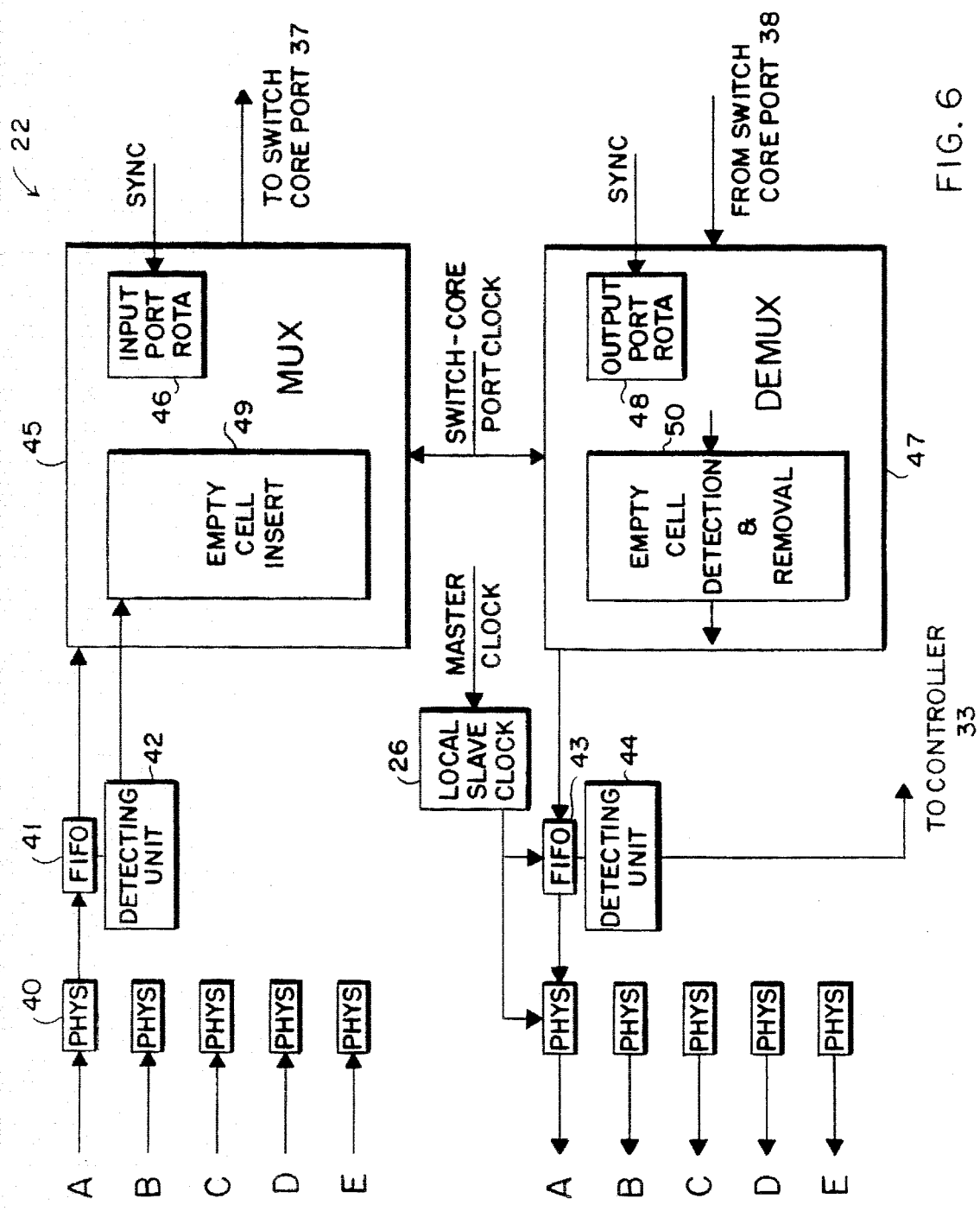
FIG. 6 is a block diagram of an adaptor card of the FIG. 3 switch.

An example of an Adapter card 32 is shown in FIG. 6 which is intended to interface five external low-speed ports A to E to one switch core port. Only the port A components are shown for reasons of clarity. The adaptor card 22 comprises the following elements:

- a respective physical layer/framer unit 40 for each port A to E. The units 40 carry out the header error check functions mentioned above.
- a small (two cell) input FIFO 41 for the input side of each port A to E; these FIFOs help to match the rates of the input ports to the switch core port.
- a respective unit 42 for detecting when the contents of a corresponding one of the input FIFOs 41 falls below an amount equal to one cell.
- a small output FIFO 43 for the outside side of each port A to E; these FIFOs help to match the rate of the switch core port to that of the output ports.
- a respective unit 44 for detecting when the contents of a corresponding one of the output FIFOs 43 exceeds an amount corresponding to one cell.
- a Time Division Multiplexer 45 which multiplexes cells from each of the input ports into a switch core input port 37. Cells are sent cyclically in a predetermined port order (discussed below) that is held in an input port rota unit 46; the start of the port rota cycle is dictated by the global synchronisation signal.
- a Time Division Demultiplexer 47 which takes cells from the corresponding switch core output port 38 and sends them to the appropriate output port A to E. Cells arrive in a predetermined order that is held in a programmable output port rota unit 48 that is synchronised to the global synchronisation signal.
- a local clock unit 26.
- Due to the close functional association of the multiplexer 45 and demultiplexer on the one hand, and the associated switch core port on the other, the multiplexer and demultiplexer 47 are clocked by clocking signals supplied from the switch core port to provide synchronised transfer of cells to/from the switch-core fabric 30.

The switch core port is run at a speed slightly greater than the cumulative speeds of the external ports associated with it (the output side of these latter ports being clocked from the local clock unit 26 which is set accordingly). One reason for doing this is to accommodate variation in the actual speed of the links connected to the external ports from their nominal values. This overrunning of the switch core port means that the input FIFOs 41 are being emptied faster than they are being filled. To deal with this, whenever the contents of one of the FIFOs 41 fall below an amount corresponding to one cell, the associated unit 42 signals the multiplexer 45 causing an empty-cell insertion unit 49 to generate and send an empty cell to the controller 33 in the appropriate time slot; this allows the input FIFO to fill again.

Conversely, the output FIFOs 43 are being filled faster than they can be emptied. This is handled by the appropriate unit 44 on detecting that the contents of its associated output FIFO 43 is more than one cell, providing a corresponding indication to the controller 33. If this indication is present upon the controller 33 preparing to send a cell to the corresponding external port, then the controller will send an empty cell instead to the external port. A unit 50 of the demultiplexer 47 is arranged to detect and delete this empty cell, allowing the FIFO 43 to drain.

Figure 7:
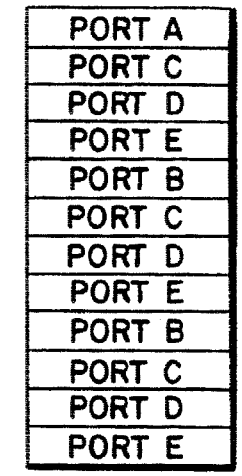
FIG. 7 is a table depicting a service rota for the external switch ports of the FIG. 6 adaptor card.

Considering next the order of servicing of the external ports as established by the port rotas stored in units 46 and 48, clearly the higher speed ports will need servicing more frequently than the lower speed ones. In general terms, the cell period of the lowest speed port sets the overall cycle time of the port rota, this lowest speed port only needing to be serviced once during the cycle whilst the higher speed ports will need servicing two or more times. FIG. 7 illustrates a possible port rota for the FIG. 6 adaptor card. During each cell period T of the associated switch core port, one cell is transferred to/from the switch core port from/to the external port A to D next on the port rota.

Processor

The processor unit 24 performs virtual channel connection setup and management, by receiving requests for connections and manupulating data structures in the controller 33. The processor also initialises controller data structures at power up.

To accomplish these functions the processor unit 24 has two interfaces to the switch core. The first is a cell interface through the processor input and output ports of the switch fabric; this allows the processor to send and receive cells, just as it would be able to do were it attached to one of the input/output ports on an adapter card.

The second interface is directly with the controller itself (see FIG. 4) to allow the processor to access internal data structures in the controller, so that it can set up and modify virtual channel data. The processor accesses the controller while the controller is idle because an empty cell has been received. To ensure that sufficient empty cells are received, the switch core is run slightly faster (about 10%) than the rate needed to cope with the input and output ports with the result that the adapter card FIFOs 41 periodically drain below their one-cell thresholds, causing the empty cell insertion units 49 to operate.

Although the processor has full access to all the data structures in the controller, it does not have any access to the shared cell body memory.

The general operation of the processor unit 24 in effecting initialisation and connection set up is in accordance with known practices in the art and will not therefore be further described.

Controller Concepts and Overview

Overall External Port Rota

It is essential for the controller 33 to know from which external (adaptor card) port a cell header has been received because the (VPI+VCI) information in each header is only unique on a per-link basis; the external port identity is thus necessary to uniquely identify a cell header as relevant to a particular instance of communication through the switch. One way of informing the controller of the relevant external port identity would be to arrange for the adaptor cards to tag each cell header. However, it is possible to use a different approach for the present controller because both the order in which each adaptor card services its associated external ports and the order in which these adaptor cards are serviced through the corresponding switch core ports, are predetermined. Thus, in the present controller, the external port identity associated with a cell header is determined by the controller on the basis of when the header is received. More particularly, an external port rota is derived indicating the order in which cell header will be received from the external ports of all the adaptor cards connected to the switch core; thereafter, the controller 33 accesses this rota in coordination with the operation of the adaptor-card multiplexers 45, the controller 33 and multiplexers 45 having been initially synchronised by the global synchronisation signal previously referred to. The external port rota itself is a combination of the switch-core port cycle shown in FIG. 5 (showing in which order cell headers are passed from the switch-core ports to the controller), and the external port service cycle for each adaptor card (see FIG. 7). This combination is effected by taking the next entry on the external-port service cycle for an adaptor card, each time the corresponding switch-core port appears on the switch-core port cycle. Thus for a switch-core having the FIG. 5 port cycle with switch-core port P1 connected to an adaptor card having a service cycle as shown in FIG. 7, successive services of port P1 in the FIG. 5 cycle will be associated with successive ones of the external ports A to E according to the FIG. 7 cycle.

The external port rota is, of course, dependent on the port make-up of the adaptor cards connected to the switch core. For this reason, the external port rota is determined at start up of the switch by the processor unit 24 interrogating each adaptor card to discover its external-port service cycle. The processor unit 24 then stores the rota in an appropriate data structure 60A of the controller 33 enabling the controller to access the rota as required.

The external port rota is not only needed by the controller to determine the source of each new cell header it receives, but also to coordinate its output of headers with the predetermined order in which the external ports are made available for switchcore output (this being determined by the combined operation of the fabric 30 and the de-multiplexers 47 on the adaptor cards). As already noted, the order in which ports are serviced for input and output need not be the same but in general they will be. In the present case, the same general form of external port rota is used for output from the controller as for input the external input-port and output port rotas being respectively referenced 60A and 60B in FIG. 8.

Master and Output VCNs

In order uniquely to identify a flow of associated cells in the switch, a VCN (virtual channel number) is used by the controller. Every input virtual channel has its own VCN, called a "master VCN" and every output virtual channel has its own "output VCN". For each unicast connection through the switch, there is thus one master VCN and one output VCN, whilst for each multicast connection group, there is one master VCN and a plurality of output VCNs. For the unicast case, it is convenient to use the master VCN also as the output VCN; indeed even for the multicast case, it is convenient to use the master VCN also as the first one of the output VCNs.

As will be more fully described hereinafter, the master VCN is derived from the (VPI+VCI) of a cell header in combination with the identity of the external port providing the cell. Each cell header passed to the controller 33 will first have its master VCN determined (see block 61 in FIG. 8) and this master VCN is then used to control queuing of the header in the controller. The output VCNs are allocated by the processor unit when setting up a connection and are used for effecting output queuing and scheduling. The output VCNs are associated with their corresponding master VCN in appropriate dam structures of the controller enabling translation in both directions, that is, master VCN to corresponding output VCNs, and output VCNs to corresponding master VCN.

Two Controller Paths

Figure 8:
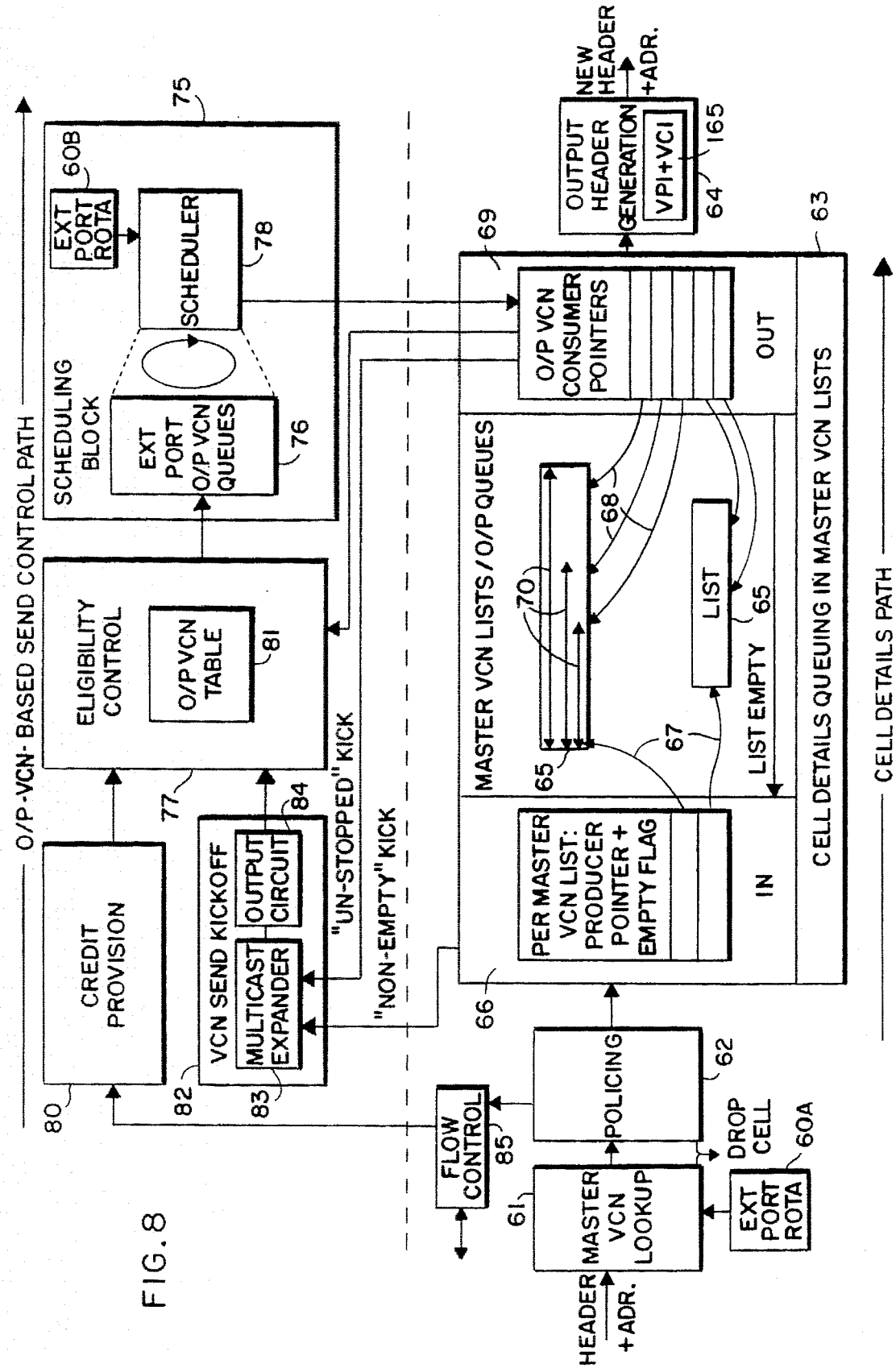
FIG. 8 is a functional block diagram of a controller of the FIG. 4 switch core block.

As illustrated in FIG. 8, there are two paths in the controller 33, one for queuing cell details (that is, for each cell, certain cell header data and the corresponding cell body address), and the other for queuing and scheduling output VCNs to control the output of cell headers from the controller 33.

Cell Details Path—This path involves, after the lookup of the master VCN of a cell header, a policing block 62 for checking whether the cell details for the cell concerned can be stored or should be discarded, a cell-details queuing block 63, and an output header generation block 64 that receives from block 63 cell details for the next header to be output, generates the new header (including looking up the new VPI+VCI), and outputs the new header and the address of the corresponding cell body. The cell details of cells with the same master VCN (i.e. cells from the same VC source) are all queued in the same LIST 65 stored in the block 63, the cell details of each cell being stored as a respective list entry. The list 65 is created, empty, by the processor unit upon set up of a connection. For each list, a cell-details input control 66 maintains a producer pointer 67 pointing to the tail of the list (which is where entries are added), and an empty flag indicating whether or not the list 65 is empty.

The head of each list 65 is the cell-details entry for the oldest cell still to be sent out in respect of the incoming cell stream for the master VCN concerned. For unicast VCs, the head list entry identifies the next cell to be output for the sole output VC; this head entry is pointed to by a consumer pointer 68 maintained for the output VCN concerned by a cell-details output control 69. For multicasts, there are of course a plurality of output VCs for each input stream, and it is necessary to track for each output VC its progress along the corresponding list 65 in outputting cells; this is achieved by providing a respective consumer pointer 68 associated with each output VCN. In effect, a respective cell-details QUEUE 70 is kept for each output VCN, this queue being mapped onto the list 65 for the associated master VCN with the head of the queue being pointed to by the corresponding consumer pointer 68 and the tail of the queue being pointed to by the producer pointer for the master VCN concerned. This concept of having a respective cell-details list 65 associated with each master VCN, and respective queues 70 mapped onto the list for the associated output VCNs, is an important one in the operation of the cell-details queueing block 63.

Upon the head entry of a queue 70 being output by the output control 69 to cause the output of a cell for the corresponding output VCN, the consumer pointer 68 for the queue 70 is adjusted to exclude that entry from the queue. When the head entry of a list 65 has been excluded from all the queues 70 mapped onto the list, this entry is freed and the output control 69 also causes the corresponding cell body address to be put back on the free address list 32.

Output VCN Send Control Path—The order of output of cells from the switch through the appropriate external switch ports is determined by a send control path that operates on the basis of the output VCNs set up for the output virtual channels. As will be more fully described hereinafter, output VCNs are injected into this path by an output-VCN send kickoff block 82 that is itself "kicked" by the input-control 66 of the queuing block 63 whenever a list 65 changes from an empty to a non-empty state. Kicking the block 82 involves passing the block the master VCN of the list concerned; the kickoff block 82 converts this master VCN into the output VCNs associated with the master VCN—these output VCNs being those having associated queues 70 mapped onto the list 65 that has just become non-empty. These output VCNs thus represent the Virtual Channels for which a cell has now become available for sending. The kickoff block 82 injects these output VCNs into the send control path (in particular, into an eligibility control block 77). Once an output VCN has been injected into the path, it will circulate in the path, periodically prompting the sending of a cell, until the corresponding cell-detail queue 70 indicates that there are no more cells available for sending in respect of the output VCN concerned.

The main components of the send control path are the eligibility control block 77 and a scheduling block 75. The actual scheduling of cell output is effected by the scheduling block 75 that maintains a respective queuing structure (see block 76) for each external port; each of these queuing structures is used to queue the output VCNs of all the output virtual channels that are associated with the corresponding external port and for which there is at least one cell eligible for sending. A virtual channel has one or more cells eligible for sending if there is at least one entry in the corresponding output VCN queue 70 (unless temporarily blocked from being sent—see explanation of "stop bit" below) and the virtual channel has credit for sending (as explained below) where such credit is required.

It is the job of the eligibility control block 77 to determine when an output virtual circuit has one or more eligible cells and when it so determines, it passes the corresponding output VCN onto the scheduling block 75 for queuing on the appropriate queuing structure. These queuing structures can thus be thought of as queuing "eligible" output VCNs. The queuing of the eligible output VCNs on the appropriate queuing structure is achieved by storing in a table 81 in block 77 the identity of the appropriate queuing structure for each output VCN, this information being passed to block 75 with each output VCN.

The operation of the eligibility control block 77 and associated blocks 80, 82 will be considered further later; for the moment, however, it will be assumed that the queuing structures of the scheduling block 75 have been populated with eligible output VCNs.

The scheduling block 75 includes a scheduler 78 whose operation is coordinated with the operation of the fabric 30 and adaptor-card demultiplexers through synchronised access to the external port rota 60. The scheduler 78 examines the output VCN queuing structure for each external port in the appropriate slot of the rota 60, and outputs the VCN (if any) of highest priority for that structure on line 79 to the output control 69 of the cell details queuing block 63. The output control 69 then uses the consumer pointer 68 for the VCN concerned to access the cell-details entry at the head of the corresponding cell-details queue 70 and passes these details to the output header generation block 64 where the new header is generated; meanwhile, the output control 69 adjusts the consumer pointer 68 for the VCN concerned to point to the next entry in the corresponding list 65.

An output VCN will only appear once in the queuing structure 76 appropriate for the external port concerned, regardless of how many eligible cells there are for the corresponding VC. Each time the scheduler 78 outputs a VCN, it is removed from the corresponding queuing structure. The output control 69 on outputting cell details on an output VCN, passes this output VCN to the eligibility control block 77 so that the latter can decrement the credit for that output VCN; at the same time, if the output control 69 determines that there are one or more further cells ready for sending on the corresponding cell-details queue 70, then it will so inform the eligibility control block 77 by passing it a "more-cells" indication. If the eligibility control block 77, after updating, has further send credit recorded for this output VCN (or if no credit is required), then the output VCN is passed back to the scheduling block 75 where it rejoins the corresponding queuing structure; however, if no send credit is immediately available (and is required), then the eligibility control block 77 awaits the receipt of such credit from a credit provision block 80 before passing on the output VCN to the scheduling block 75. The credit status of each output VCN is held in the table 81 kept by the eligibility control block 77.

If the output control 69, after outputting cell details for a particular output VCN, determines that the corresponding queue 70 is empty, it does not pass the "more cells" indication back to the eligibility control block 77. However, if at the same time, the output control 69 determines that there are no entries remaining in the corresponding list 65 (all queues 70 relevant to the list having been emptied), it signals this to the input control 66 to cause the empty flag for the list to be set.

From the foregoing, it can be seen that once the eligibility control block 77 has been signalled by the kickoff block 82 that a new cell has arrived on the queues 70 of particular output VCNs, each of these output VCNs gets circulated around between block 77, the scheduling block 75 and the output control 69 until the latter determines there are no more eligible cells for that output VCN (it being appreciated that new entries may be added to the relevant queues 70 whilst the output VCNs are awaiting scheduling in respect of each entries). The non-availability of send credit may temporarily halt this process but as soon as new credit becomes available, the process recommences.

When an output VCN ceases to be circulated (because there are no more entries available in its queue 70), then it must await re-injection into the send control path by the kickoff block 82 before it can be rescheduled for sending.

Quality of Service

The switch offers connections with three different qualities of service, these are:

Guaranteed Bandwith with low maximum latency (GB0)

Guaranteed Bandwidth with higher maximum latency (GB1)

Best Effort (BE)

Figure 9:
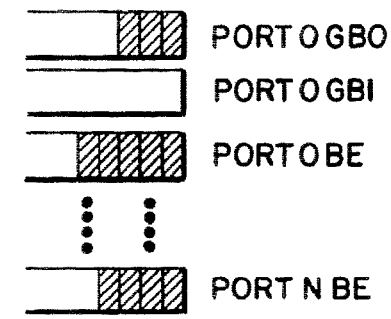
FIG. 9 is a diagram illustrating port queues kept by a scheduler of the FIG. 8 controller.

To this end, each external port queuing structure (block 76) in the scheduling block 75 actually comprises three queues, one for each quality of service, and each eligible output VCN is added to the appropriate queue (the identity of this queue being held in table 81 of the eligibility control block and being passed to block 75 with the output VCNs). As will be appreciated, this results in a fair queuing policy within each class of service. FIG. 9 illustrates the external-port output VCN queues maintained by the scheduling block and shows the provision of three queues per external port in the case of an external port identified as Port 0. Each time the scheduler 78 examines an external-port queuing structure in the corresponding slot of the rota 60, it will take the output VCN at the head of the highest priority non-empty queue, the priority order of the queues being GB0, GB1, BE.

For the Guaranteed Bandwidth Services, an appropriate amount of the shared memory 31 is reserved for each input VC subject to such service. Furthermore, as will be described hereinafter, for the Guaranteed Bandwidth services, a credit control scheme is operated based on token buckets. Should a Guaranteed Bandwith Source exceed its guarantee (that is, it produces more cells per unit time than the switch has guaranteed to handle), then the eligibility control block will either temporarily halt the sending cells for that VCN (shaped output) or will temporarily treat the connection as a Best Effort connection (unshaped output).

Best Effort traffic may or may not be flow controlled. In the case of flow controlled traffic, a fixed amount of memory will be allocated to each input VC and credit will be issued to upstream nodes based on the amount of this memory that is free. For each output VCN a count will also be maintained of the credit that downstream nodes have advertised. This upstream/downstream credit control is managed by a flow control block 85, the credit count for a flow-controlled output VCN being kept in the present node by the eligibility control block 77. When this credit count becomes zero, the eligibility control block prevents the VCN being passed to the corresponding scheduler queue, thereby halting transmission.

Best Effort connections which are not flow controlled can have an arbitrary amount of memory allocated to them. If there is contention on the output and this memory is exhausted then cells will be dropped.

Multicasts, Empty Flags and Stop Bits

As described above, in the case of a multicast (multiple output VCs for one input VC), the corresponding cell-details list 65 has several queues 70 mapped onto it, each corresponding to a particular output VCN. Again, as already described, the output control 69 for the queuing block 63 does not cause the empty flag of a list 65 to be set until all the queues 70 associated with the list 65 are empty. The reason for this is that the change of the empty flag from its set to unset state upon arrival of a new header whose cell details are to be queued on the list 65, causes the input control 66 to "kick" the send kickoff block 82 resulting in injection into the send control path of all the output VCNs associated with the list; if the empty flag of a list were to be set upon only one associated queue 70 becoming empty, then the send kickoff block 82 could be kicked to inject output VCNs into the send control path when some of the output VCNs were still present in the path. The result of this would be unfair output scheduling.

During switch operation, it may happen that a new list entry is added between the time:

(i) one of the queues becomes empty following consumer pointer adjustment to exclude from the queue 70 the head entry of the list 65 after this entry has been used for outputting a cell header for the output VC concerned, and (ii) another of the queues has the same list entry excluded by consumer pointer adjustment, again after the entry has been used for outputting a header for the output VC related to that queue.

In these circumstances, the second of the aforesaid queues will not be empty when it excludes the entry that made the first of the queues empty and so the empty flag will not be set by the output control 69, even if all other queues are empty. It will be apparent that queues that have become empty under these circumstances may not get a chance to re-enter the scheduling process because new cell-details entries could continue to be added to the list in a way that the aforesaid non-empty list always remains such. Because there will be a finite limit to the amount of memory allotted to a particular input VC, in due course, cells will be lost.

In order to avoid this problem, each cell-details entry in a list 65 has an associated "stop-bit". If in a multicast case, a queue 70 becomes empty, the output control 69 will set the stop bit of the head entry (i.e. the entry just excluded from the empty queue). Upon any other queue on the same list excluding this entry (because a cell header based on it has been sent out for the output VCN concerned), the corresponding output VCN is not re-circulated back to the eligibility control block 77; the queue has been effectively "stopped". However, once all queues have used the entry whose stop bit is set, that entry is removed and the VCN send kickoff block is kicked by the output control 69 (see "un-stopped" kick in FIG. 8) with the corresponding master VCN to re-inject all the relevant output VCNs into the send control path.

The Output VCN Send Kickoff Block

The general functionality of the kickoff block 82 has already been described but several addition points are worthy of comment at this stage. The block 82 comprises a multicast expander 83 and an output circuit 84. The multicast expander 83 is arranged to make available all the output VCNs corresponding to a particular master VCN when the expander 83 is "kicked" with that master VCN. The multicast expander 83 is (re)programmed with appropriate data from the processor unit each time a connection is set up or taken down so that it is continuously kept up to date and able to relate every current master VCN with the corresponding output VCNs. The output VCNs made available by the expander 83 are passed one by one by the output circuit 84 to the eligibility control block 77.

The Kickoff block 82 is implemented in a way enabling it to absorb all the kicks it receives whilst not having to complete the processing associated with each kick before it can receive another. This can be done, for example, by including an input FIFO for the kicks or possibly by providing an output VCN FIFO; generally, what is needed is the provisions of FIFO buffering at a point upstream of where the block 82 needs to effect per output VCN operations, such as transfer to the eligibility control block 81.

The importance of this arrangement and of the circumstances under which the block 83 is kicked is that the expansion inherent in multicasting is dealt with in a way that produces the minimum processing strain on the controller. Thus, each master VCN and output VCN only ever has one occurrence in block 83 and this permits particularly efficient memory utilisation to be effected. Furthermore, the per output VCN processing associated with any particular kick does not have to be finished before the next kick can be received.

Master VCN Lookup Block

The present invention relates to the generation of a manageable master VCN and, accordingly, the master VCN lookup block will now be described in more detail.

As already described, when a cell arrives at the switch core, its header is passed to the controller 33; here, it is initially handled by the master VCN lookup block 61. On receipt at the block 61, the header consists of the following fields:

Generic Flow Control (GFC), 4 bits,

Virtual Path Identifier (VPI), 8 bits,

Virtual Channel Identifier (VCI), 16 bits

Payload Type (PT), 3 bits, and, a bit which for AAL5 connections forms an End of Packet bit (EOP).

Note that by this time the fifth byte of the header, the Header Error Check (HEC) has been removed because it has been verified in the appropriate adapter card. A failed HEC will have resulted in the cell being marked as empty (VPI=VCI=0).

The cell body address is also passed to the VCN lookup block 61 along with the corresponding cell header.

The following operations are performed on the header by block 61:

- the cell is discarded if its VPI and VCI are set to zero, this discarding being done by returning the cell body address to the free address list 32;
- the GFC is discarded;
- the PT and EOP are extracted for storage with the cell body address so that the output header can be generated correctly, these items being referred to herein as the "cell details";
- the VPI and VCI are concatenated with a number (port number) identifying the external port on which the cell was received to produce a unique identifier (herein the long channel identifier) for the connection which the cell is associated; the long channel identifier is then used to look up the master VCN associated with the cell.

It is this fourth function which is the main one for the block 61 and will now be described in more detail.

The VPI and VCI information used to derive the long channel identifier for a cell are directly available from the cell header; the port number identifying the external input port on which the cell has been received is derived in the present embodiment from the external input-port rota 60A, each external port appearing in the rota having an associated unique number.

Once the input port number has been obtained it is concatenated with the VPI and VCI to give the long channel identifier which is about 30 bits long (the exact length will depend on the number of ports the switch can have). This number is then used to find the master VCN of the connections with which the cell is associated.

As it is impractical to have a simple lookup of a number this size, a multistage lookup process is used.

Figure 10:
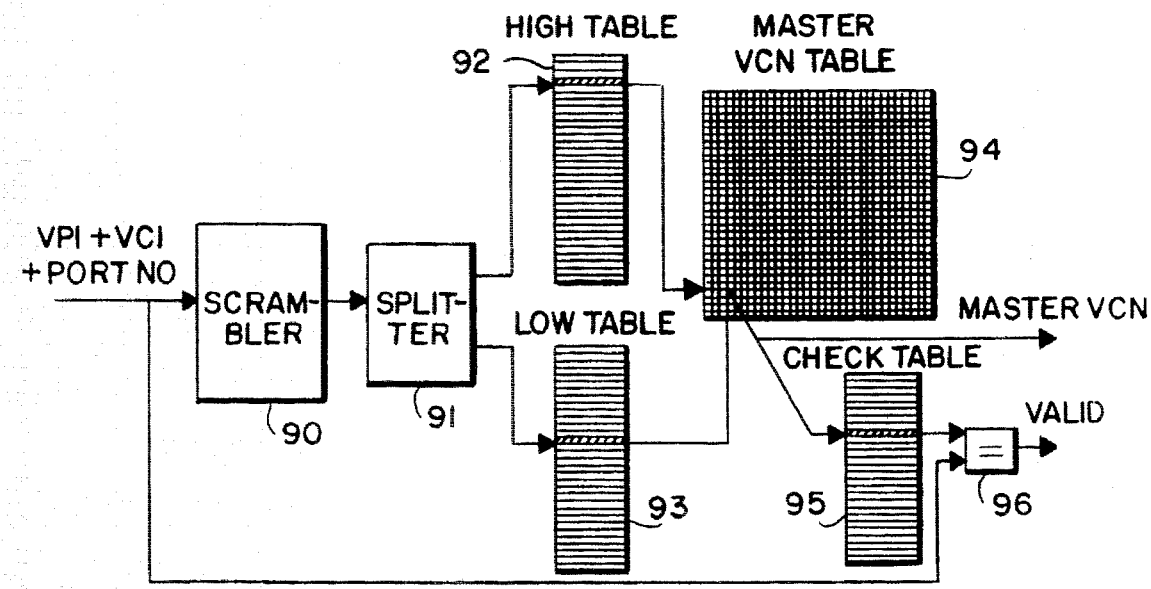
FIG. 10 is a diagram of a master VCN lookup block of the FIG. 8 controller.
Figure 16:
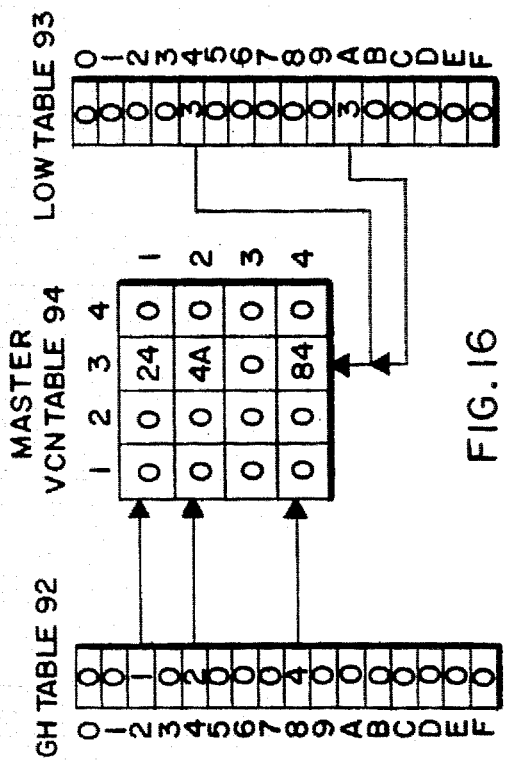

The lookup process comprises the following steps:

1. The long channel identifier (VPI+VCI+port number) is scrambled in scrambler 90 (see FIG. 10). The scrambler may be of standard form such as one based on a linear feedback shift register where the channel identifier is used as a seed word for the linear feedback shift register which is then shifted by the word length to give the scrambled output word.
2. The scrambled long channel identifier is divided into two parts by splitter unit 91. One part (the top part) is used to look up a "row index" in a "high table" 92 and the other part (the bottom half is used to "look up" a "column index" in a "low table" 93.
3. The "row index" and "column index" are then used to access a two-dimensional table 94 which contains the master VCNs.
4. Finally, the master VCN is used to look up a long channel identifier in a check table 95, this identifier corresponding to the one that should have been used in step 1 if all is working well; the looked up identifier is compared against the actual original long channel identifier in comparator 95 to check that the process of steps 1 to 3 did not give a false result (if it did, the cell is discarded by adding the cell body address to the free address list).

The reasons for performing each of the steps of the lookup process are as follows:

Step 1. The need to scramble the long channel identifier arises because it is likely that most long channel identifiers for cells from the same link will have identical top halves (probably zero). Unless the long channel identifiers are scrambled, they would therefore all index to the same index in the high table 92 allowing only one row of the master VCN table 94 to be used. Scrambling distributes differences across the whole identifier, thus improving the utilisation of both the row and column tables, allowing the master VCN table to be used more efficiently.

Step 2. The scrambled long channel identifier is split in half because it is impractical to look up a 30-bit number, while it is quite practical to look up a 15-bit number (a 32 K entry table is needed). Splitting the number into more pieces would result in three 1 K tables. While this appears at first to be attractive, the resulting tables are too small to allow many VCs to be supported so this option would only be suitable in special situations.

Step 3. The result of the high and low table lookups are used to index the master VCN table because, although these two results uniquely identify the connection, the results are sparse. This is because the process does not work well when the master VCN table is more than about a quarter full. Therefore using the high and low tables results directly would give a VCN space four times bigger than it needs to be and would push up the memory requirements of all the per VCN data structures in the rest of the controller accordingly.

Step 4. The long channel identifier check is done because it is possible that cells might arrive on VCs that have not been set up. If the check was not performed and such a VC happened to index a valid master VCN, then its cells would be treated as if they had come in on the VC corresponding to that master VCN.

The foregoing lookup process allows fast lookups of large numbers of VCNs to be performed at low cost in hardware. For instance 8000 master VCNs associated with up to 64 external ports would require a 32 K×8 high table, a 32 K×8 low table, a 64 K×13 master VCN table and a 8 K×30 check table.

When a VC connection is set up, the processor unit 24 calculates the entries to put in the various tables of the master VCN lookup block 61. As will be appreciated from the examples given hereinafter, the processor unit 24 generally has only limited freedom in choosing entries for the high and low tables 92, 93; on the other hand, the value of master VCN inserted into the table 94 can be freely chosen by the processor unit provided it does not conflict with existing values. In setting up the tables 92, 93, it is possible that the processor unit might find that a particular VC will initially not fit into the existing tables without conflict with a previously set up VC (in particular, the scrambled long channel identifiers of the new VC and a previous VC both map into the same master VCN table entry). In this case, the processor unit will endeavour to modify the master VCN table 94 to remove the conflict (as will be described below); if this fails, the processor unit 24 is arranged to change the scrambling function used by the scrambler 90 and to generate the new tables so that a conflict no longer exits. In order to support this operation, the high, low and master VCN tables are double buffered, allowing lookup to continue in the active table while the processor unit rewrites the inactive table.

The general process employed by the processor unit 24 to set up the tables 92 to 94 to add a new VC will now be described with reference to FIG. 11 to 20. The process will be described in terms of simple examples in which the scrambled long channel identifier is taken to be eight bits long represented as two hexadecimal digits. These digits are respectively used to access the High and Low tables 92, 93 which are thus each sixteen entries long (see FIG. 11). The size of the master VCN table has been chosen to be four rows by four columns, each numbered from 1 to 4. For ease of understanding, the master VCN inserted into an occupied entry in the master VCN table 94 will be made the same as the scrambled long channel identifier used for accessing the high and low tables. Although the examples now to be given are relatively simple, the operations they illustrate can be used for much larger master VCN populations supported by larger high, low and master VCN tables.

For brevity, in the following examples, the scrambled long channel identifier that is split to access the high and low tables is referred to as the "VCID"; additionally, the prefix "master" will be dropped in referring to master VCNs and the master VCN table 94.

The example shown in FIG. 11 shows the tables configured for one VCID, B6. When the VCID is presented, it is split in half; B is used to index the High table, giving row 2; and 6 is used to index the low table giving column 3. Finally the VCN is looked up in the VCN table 94 using the row value 2 from the high table and the column value 3 from the low table (giving an entry location value of 2, 3) and a value of B6 is found for the VCN.

When adding a new VCID there are four possibles cases:

1. Both the High and Low table entries referenced by the VCID are empty,
2. The High table entry is occupied, and the Low table entry is empty,
3. The High table entry is empty, and the Low table is occupied,
4. Both the High and Low table entries are full.
5. Each of these cases will be dealt with in turn.

1. Both the High and Low table entries referenced by the VCID are empty In this case, the processor unit 24 can choose what row and column values it inserts into the High and Low table entries accessed by the respective halves of the VCID. In making this choice, the processor unit first finds the least full row in the VCN table and inserts this row number in the High table. Within this row the least full column with a free entry in this row is chosen and this column number is inserted in the Low table. An example of a case 1 situation is shown in FIG. 12 where the VCID of 8D is being added to the FIG. 11 example. This would result in location (1,1) being chosen. The process cannot fail in this case unless the VCN table is full.

2. The High table entry is occupied, and the Low table entry is empty, in this case, the row which can be used is fixed by the entry already in the High table. The processor unit selects the column value to be entered into the Low table by looking for the least used column of table 94 which has a free entry in this row. This case 2 would occur if the VCID 8C were added to the FIG. 12 example. This would result in location (1,2) being chosen as shown in FIG. 13. This process will fail if the row is full. However, in the practice, such failure is unlikely because entries are always added in the least full row so rows do not generally become full. Nevertheless, if such a failure should occur, it may be possible to deal with it by reordering the table to free up entries in the row of interest.

3. The High table entry is empty, and the Low table entry is occupied This case is treated in the same way as the case 2, except that the column is fixed and a row is chosen. This case would occur if the VCID D6 were added to the FIG. 13 example. This would result in location (3,3) being chosen as shown in FIG. 14.

Figure 15:
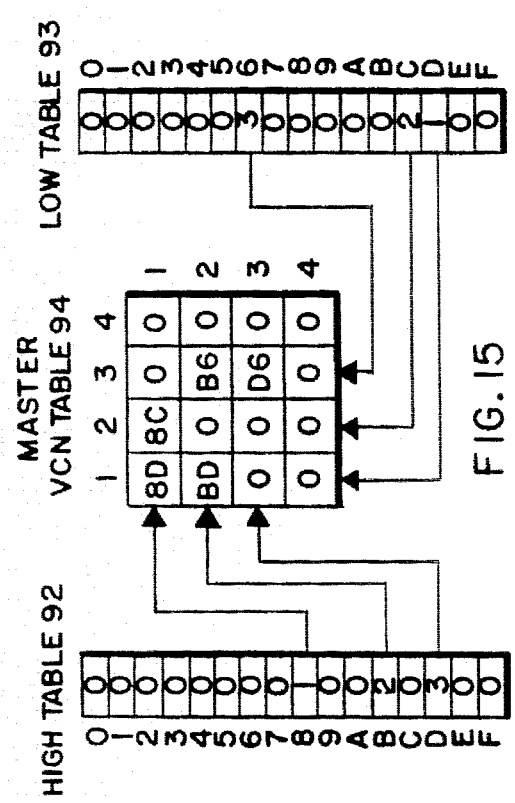

4. Both the High and Low table entries are full This case would occur if the VCID BD were added to the FIG. 14 example. Both the row and the column are fixed by the entries already in the High and Low tables; this means that location (1,2) has to be used as shown in FIG. 15.

Figure 17:
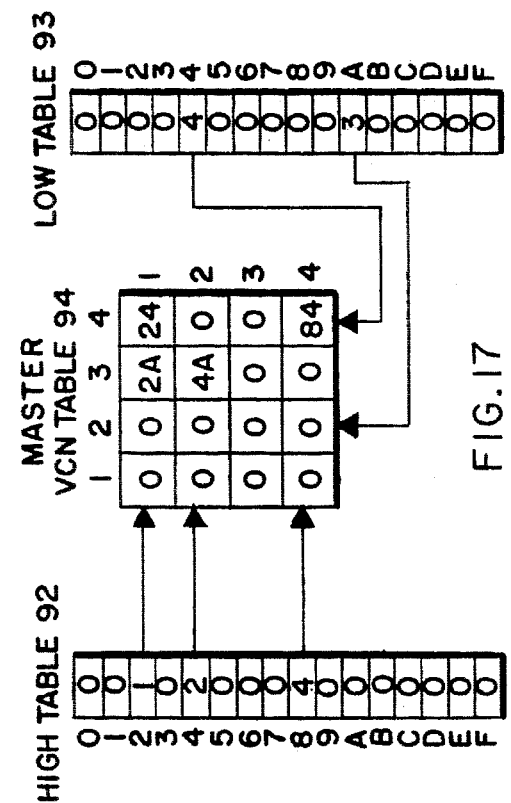

This operation was only possible, however, because location (1,2) was free. This may not always be the case as can be seen by trying to add the VCID 2A to the new example shown in FIG. 16. This entry cannot be added because the High and Low tables entries point to location (1,3) and this location is already full. The solution in this case is to move the entry 24 (called the occupying entry). Changing the row of the occupying entry will not, however, solve the problem, because the high half of the VCID of the occupying entry matches the high half of the VCID to be inserted. Thus the column of the occupying entry must be changed by altering the value stored in entry 4 of the Low table. This value is changed to point the least full column which has spaces for all the VCNs pointed to by this entry, in this case 24 and 84. The result after rearranging and adding in 2A is shown in FIG. 17.

A similar situation can arise where only the row can be moved.

Figure 18:
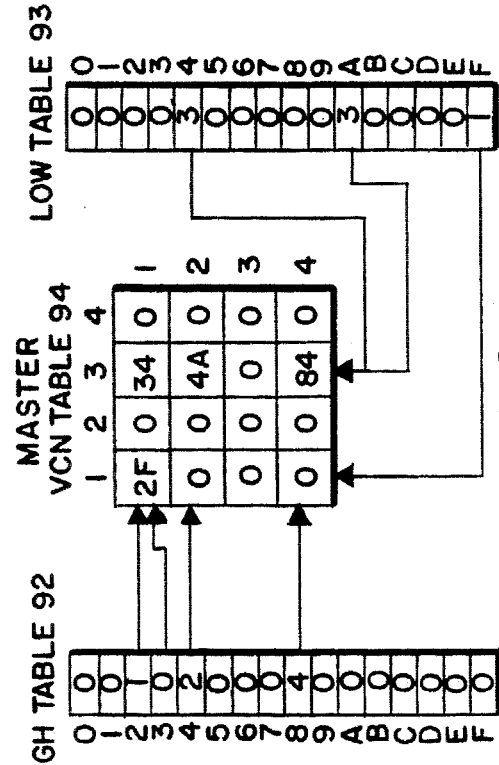

It is also possible to get a situation where either the row or the column of the occupying element could be changed. Such a case is shown in FIG. 18 where a conflict is encountered when adding VCID 2A with an existing entry in table 94 for VCID 34; note that in this case, neither the High or Low table portions of the conflicting VCID are the same.

Figure 19:
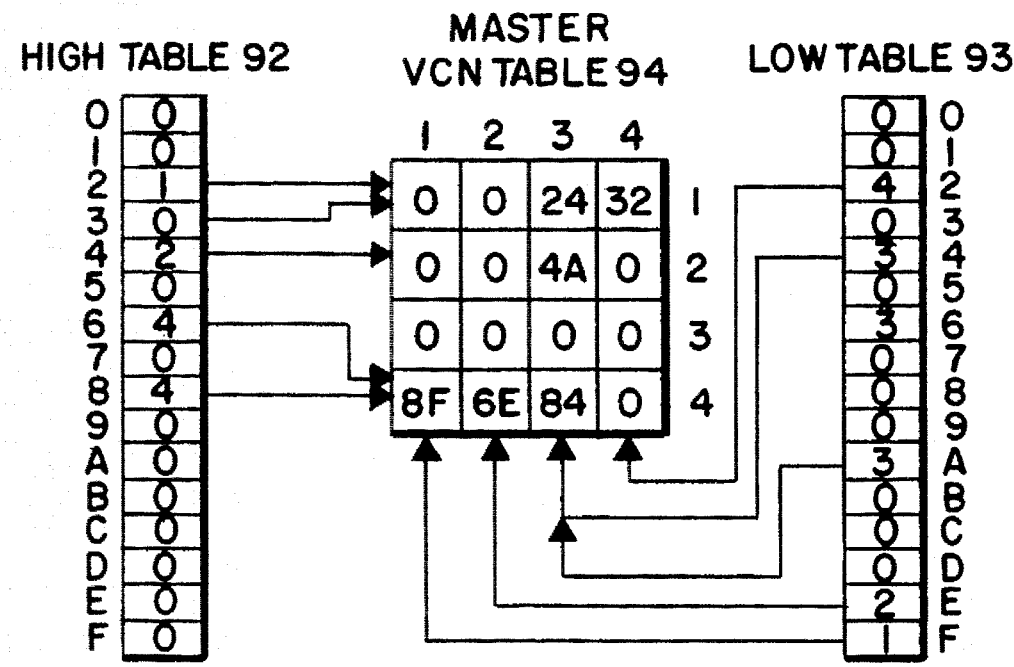
Figure 20:
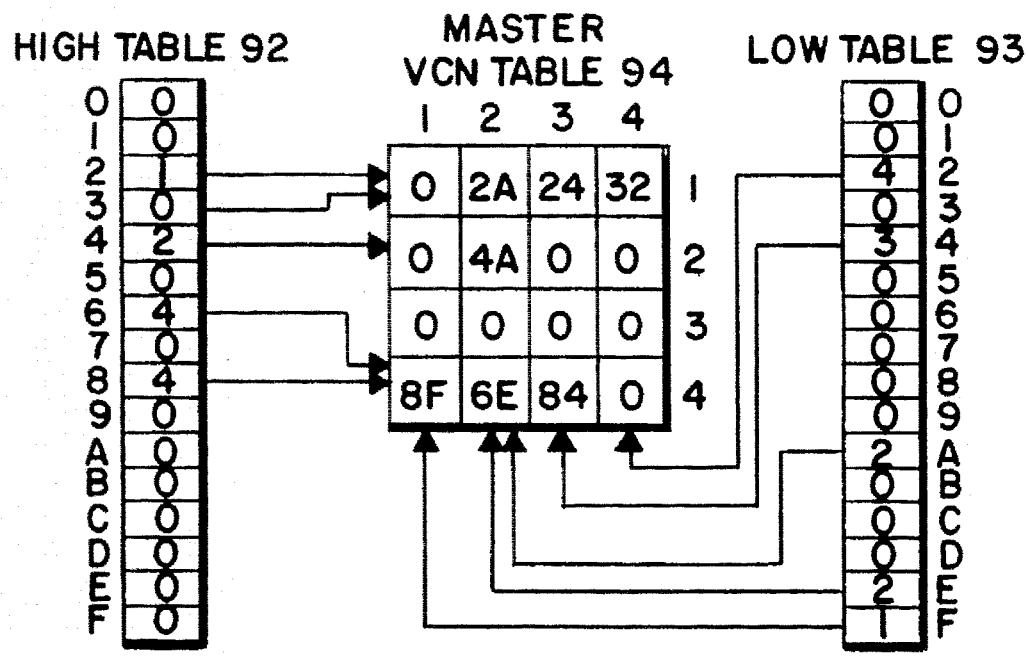

In any of these case 4 situations, it is possible that reordering will fail because there is no row or column with the correct free locations to move the occupying element to. Such an example is shown in FIG. 19 (again when trying to add VCID 2A); in this example the new VCID conflicts with an existing VCID 24 at location (1,3). As the conflicting VCIDs have the same High table reference (2), the Low table entry for the occupying entry 24 (that is, the value in Low table entry 4) must be changed. However, in this example the pointer at Low table entry 4 cannot be changed because there are no columns with rows 1 and 4 free (these being the existing occupied rows of the column requiting to be referenced through Low table entry 4). This situation is handled by removing the occupying element (24), replacing it with the element to be added (2A) and then trying to reorder the table so that the occupying element can be put back in. This operation will result in different elements of the column being moved and so may be successful. In the present example, after removing entry 24 and adding 2A, the Low table entry for A is changed from (3) to (2), this being possible because the first and second rows of column 2 in table 94 are empty and can receive the entries 2A and 4A moved by the change in the value held in the Low table entry A. Once this change has been made, the element 24 can be reinserted where it was before, as is shown in FIG. 20.

Figure 21:
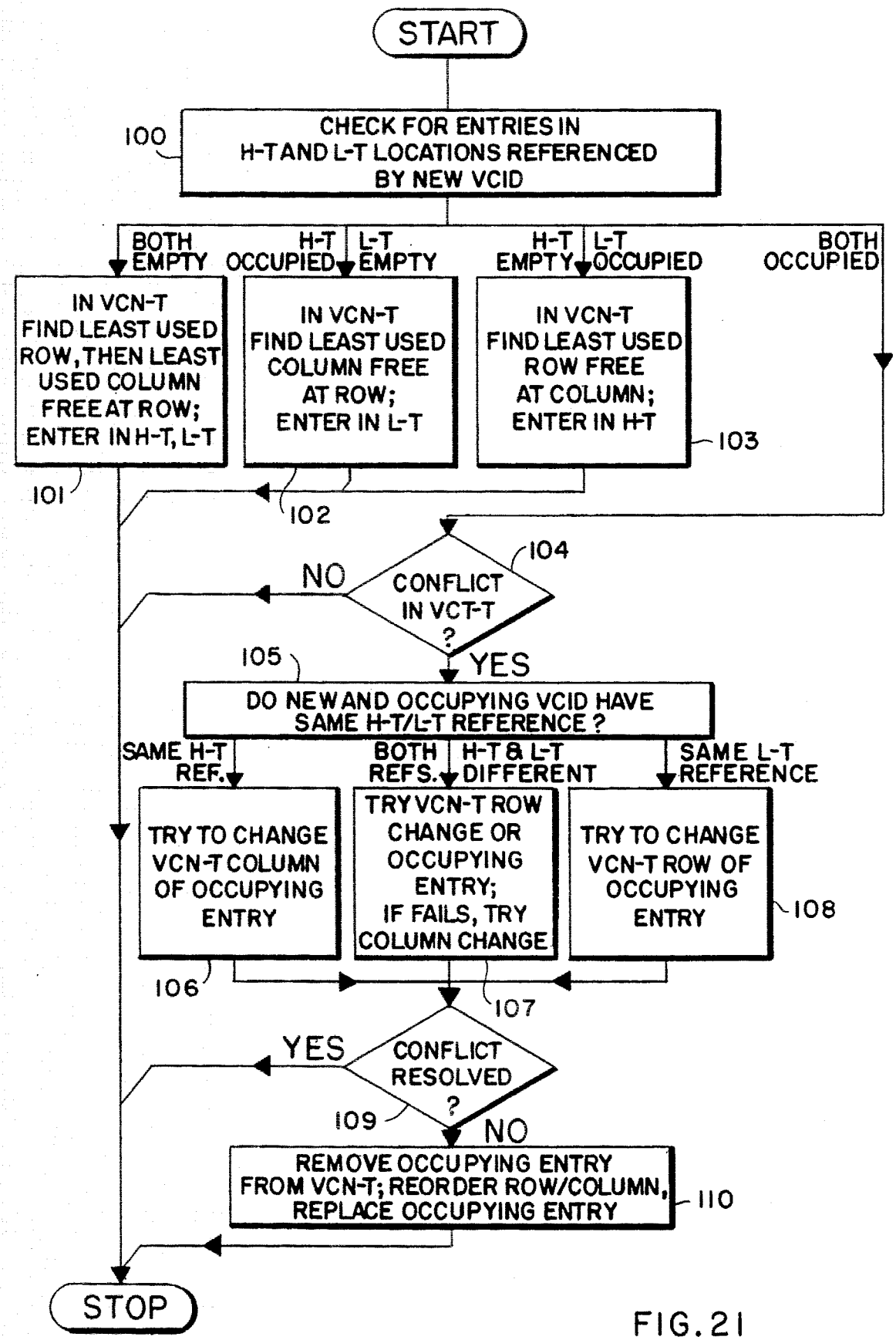
FIG. 21 is a flowchart illustrating the process for updating the tables shown in each of FIGS. 11 to 20.

FIG. 21 illustrates in flow chart form the above-described processes carried out by the processor unit 24 when seeking to update the tables 92 to 94 for a new VCID. In the flow chart, the abbreviations "H-T", "L-T", and "VCN-T" have been used for "High table", "Low table", and "master VCN table", respectively. The first step 100 of the FIG. 21 flow chart is the checking of the High and Low tables to see if the locations in these tables referenced by the new VCID are already occupied. Steps 101, 102, and 103 their correspond to the processes described above for cases 1, 2, and 3. The remaining steps 104 to 110 relate to the described case 4 processes; In particular, step 104 checks to see if there is a conflict in the VCN table whilst step 105 is executed if there is a conflict, to determine whether the new and occupying VCIDs have the same High-table or Low-table references. Steps 106, 107, and 108 are the processes for seeking to reorder the row/column of the occupying entry. If this approach fails (as tested in step 109), then step 110 is executed by which the occupying entry is removed, the new entry inserted, reordering effected, and the removed occupying entry restored.

Whilst the processor unit 21 may effect the FIG. 21 processes under software control, it will be appreciated that appropriate hardware means can be used to implement part or all of these processes, as may be desirable to ensure rapid execution. It will also be appreciated that although only two lookup keys are derived from the scrambled long channel identifier, K such keys could as well be provided CK being an integer greater than or equal to 2). In this case, the master VCN table would be a K-dimensional table and the K keys would be used to derive K indexes that, in turn, would be used to access the table. It will further be appreciated that many of the concepts of the controller described above can be applied to packet-based systems having variable length packets as well as to systems handling cells (fixed-length packets).

I claim:

1. Apparatus for carrying out predetermined functions in respect of packets received thereby through at least one input port of the apparatus, each packet including a channel label that uniquely identifies, for the input port on which the packet is received by the apparatus, a virtual channel with which the packet is associated; said apparatus including VCN-providing means for providing for each packet received by the apparatus, an identifier (master VCN), that uniquely identifies the combination of virtual channel and input port associated with the packet, and processing means for carrying out said predetermined functions in respect of each packet in dependence on the master VCN provided for the packet by said VCN-providing means, said VCN-providing means comprising:

port identification means for generating for each packet a respective port label identifying the input port on which the packet was received, combining means for combining together the channel label and port label associated with a packet to produce a long channel identifier which is then output, key-providing means for dividing up the output of the combining means in predetermined manner to provide K keys where K is an integer greater than or equal to 2, and table lookup means to which said K keys are applied, said table lookup means comprising:

respective conversion means for converting each of said K keys associated with a packet into a corresponding, shorter index, and a K-dimensional master table having locations holding respective master VCNs, the K indexes derived from the same packet serving to access a corresponding master-table location in order to provide the master VCN of the packet concerned.

2. Apparatus according to claim 1, wherein said combining means is operative to scramble said long channel identifier before it is output.

3. Apparatus according to claim 1, wherein each said packet is an ATM cell and the said channel label included therein comprises a virtual path indicator and a virtual channel indicator.

4. Apparatus according to claim 1, wherein the VCN-providing means further comprises checking means for checking the correctness of the master VCN provided by said table lookup means, the checking means comprising:

check table means associating each master VCN with at least a predetermined part of said long channel identifier that should have been involved in the provision of said master VCN, said check table means outputting said at least a predetermined part upon a master VCN being supplied thereto, and, comparison means for comparing the output of said check table means with the corresponding portion of the long channel identifier actually used in providing the master VCN supplied to the check table means, the comparison means being operative to output an indication of the result of this comparison.

5. Apparatus according to claim 1, wherein said apparatus comprises a core including said VCN-providing means, and external interface means providing a plurality of said input ports and including multiplexer means for multiplexing packets received at said input ports and passing them according to a predetermined timing to said core, said port identification means generating said port label for a packet in dependence on the time of arrival of the packet at said core.

6. Apparatus according to claim 1, wherein each said conversion means includes list means that associates the related said key with the corresponding said index.

7. Apparatus according to claim 6, further comprising new-entry means for setting up said table lookup means to provide a master VCN for the packets of a new virtual channel where the channel and port labels associated with these packets are such as to cause the application to the table lookup means of K characteristic said keys hereinafter referred to as the new keys, said new-entry means comprising:

insertion means for inserting the master VCN of the new virtual channel in a specified location of said master table, determining means for determining whether said new keys reference existing indexes in said list means, and list set-up means for inserting an appropriate said index into the corresponding list means upon said determining means determining that a said index is absent, said list set-up means choosing said appropriate index such that the K indexes referenced by said new keys, identify a location in said master table that is free and is well distributed relative to existing occupied table locations, and said list set-up means notifying the free table location indicated by said pair of indexes to the insertion means to cause the latter to insert said master VCN therein.

8. Apparatus according to claim 7, wherein said new-entry means further comprises:

examining means for examining the table location pointed to by said indexes upon said determining means determining that indexes already exist for all said new keys, said examining means on finding that said table location is free, causing said insertion means to insert the master VCN of the new virtual channel therein, and adjustment means responsive to said examining means finding that an occupying entry exists in the table location pointed to by said indexes, to determine whether by adjustment of a said index associated with the occupying entry, said table location can be freed and ,if so, to implement this adjustment and cause said insertion means to insert the master VCN of the new virtual channel therein.

9. Apparatus according to claim 8, wherein said new-entry means further comprises further adjustment means operative in the event of said adjustment means being unable to free up said table location, to remove said occupying entry and replace it with said master VCN for the new virtual circuit, and to thereafter determine whether by adjustment of a said index associated with the said master VCN, said table location can be freed and, if so, to implement this adjustment and replace said occupying entry therein.

10. A method of generating a packet-stream identifier (master VCN), for packets received through at least one input port of an apparatus intended to carry out predetermined functions in respect said packets, each such packet including a channel label that uniquely identifies, for the input port on which the packet is received by the apparatus, a virtual channel with which the packet is associated; said method comprising the steps of:

providing a K-dimensional lookup table storing master VCNs where K is an integer greater than or equal to 2, and carrying out the following sub-steps to provide the master VCN associated with a particular said packet:
(i)—generating for said packet a port label identifying the input port on which the packet was received,
(ii)—combining together the channel label and port label associated with said packet to produce a long channel identifier,
(iii)—dividing up said long channel identifier in predetermined manner to provide K keys,
(iv)—converting said keys into corresponding, respective, shorter, indexes, and
(v)—using said indexes to look up a master VCN for the packet concerned in said K-dimensional lookup table.

11. A method according to claim 10, comprising the further sub-step of scrambling the long channel identifier, sub-step (iii) thereafter being effected on the scrambled long channel identifier.

12. Apparatus for carrying out predetermined functions in respect of packets received thereby through at least one input port of the apparatus, each packet including a channel label that uniquely identifies, for the input port on which the packet is received by the apparatus, a virtual channel with which the packet is associated; said apparatus including VCN-providing means for providing for each packet received by the apparatus, an identifier (master VCN), that uniquely identifies the combination of virtual channel and input port associated with the packet, and processing means for carrying out said predetermined functions in respect of each packet in dependence on the master VCN provided for the packet by said VCN-providing means, said VCN-providing means comprising:

port identification means for generating for each packet a respective port label identifying the input port on which the packet was received, combining means for combining together the channel label and port label associated with a packet to produce a long channel identifier which is then scrambled by the combining means, key-providing means for dividing up the scrambled long channel identifier of a packet in predetermined manner to provide at least two keys, and table lookup means including a master table holding master VCNs, the table lookup means being responsive to the application thereto of the said at least two keys associated with a particular packet to output the master VCN for that packet.

* * * * *

UNITED STATES PATENT AND TRADEMARK OFFICE
CERTIFICATE OF CORRECTION

PATENT NO. : 5,555,256
DATED : September 10, 1996
INVENTOR(S) : Costas CALAMVOKIS It is certified that error appears in the above-indentified patent and that said Letters Patent is hereby corrected as shown below:

Column 1, line 22, change "am" to --are--.

Column 4, lines 40 and 41, change "and ,if" to --and, if--.

Column 4, line 49, delete "the" (second occurrence).

Column 6, line 19, change "bandwith" to --bandwidth--.

Column 7, line 61, change "As" to --A--.

Column 8, line 23, change "frown" to --from--.

Column 9, line 34, add "47" after demultiplexer.

Column 9, line 35, add "45" after multiplexer.

Column 11, line 26, change "switchcore" to --switch-core--.

Column 11, line 60, change "dam" to --data--.

Column 14, lines 41, 42, 60, and 65, change "Bandwith" to --Bandwidth--.

Column 16, line 17, change "addition" to --additional--.

Column 18, line 57, change "endearour" to --endeavor--.

UNITED STATES PATENT AND TRADEMARK OFFICE
CERTIFICATE OF CORRECTION

PATENT NO. : 5,555,256
DATED : September 10, 1996
INVENTOR(S) : Costas CALAMVOKIS It is certified that error appears in the above-indentified patent and that said Letters Patent is hereby corrected as shown below:

Column 19, line 38, delete "5."

Column 19, line 40, insert "." after "empty".

Column 19, line 53, change "empty, in" to --empty. In--.

Column 19, line 67, insert "." after "occupied".

Column 20, line 5, insert "." after "full".

Column 20, line 45, change "requiting" to --requiring--.

Column 20, line 67, change "their" to --then--.

Column 21, line 3, change "In" to --in--.

Column 21, line 18, change "CK" to --(K--.

Signed and Sealed this

Twenty-fourth Day of December, 1996

Attest:

BRUCE LEHMAN

*Attesting Officer*     *Commissioner of Patents and Trademarks*